United States Patent [19]

Roach

[11] 3,754,994

[45] Aug. 28, 1973

[54] FORMING TANK FOR LEAD-ACID BATTERY PLATES

[75] Inventor: Anthony Roach, San Leandro, Calif.

[73] Assignee: Eltra Corporation, Toledo, Ohio

[22] Filed: May 24, 1972

[21] Appl. No.: 256,322

[52] U.S. Cl. ............... 136/34, 136/166, 204/297 R
[51] Int. Cl. .......................................... H01m 35/18
[58] Field of Search ................. 136/34, 76, 27, 166, 136/81, 79, 80; 204/297 R, 297 W, 267, 286–288, 242

[56] References Cited
UNITED STATES PATENTS

| | | | |
|---|---|---|---|
| 1,675,321 | 7/1928 | Ambruster | 136/80 |
| 2,560,836 | 7/1951 | Zachlin | 136/34 |
| 2,590,703 | 3/1952 | Homan | 136/34 |
| 3,090,823 | 5/1963 | Roach | 204/286 X |
| 3,697,404 | 10/1972 | Paige | 204/267 |

*Primary Examiner*—Anthony Skapars
*Attorney*—D. Henry Stoltenberg

[57] ABSTRACT

A tank for electrically forming battery plates for a lead-acid storage battery is disclosed wherein the lugs of a double plate either positive or negative are placed in electrical contact with one horizontal bar of lead alloy in spaced groups and held in insulated position on a second horizontal bar on the opposite side of the tank during the forming operation. Supporting elements for the horizontal bars making contact with the plate lugs are made of different sizes cooperating with a slot in the upper edge of the tank to compensate for the plates of various dimensions having different power capacities.

5 Claims, 11 Drawing Figures

Patented Aug. 28, 1973

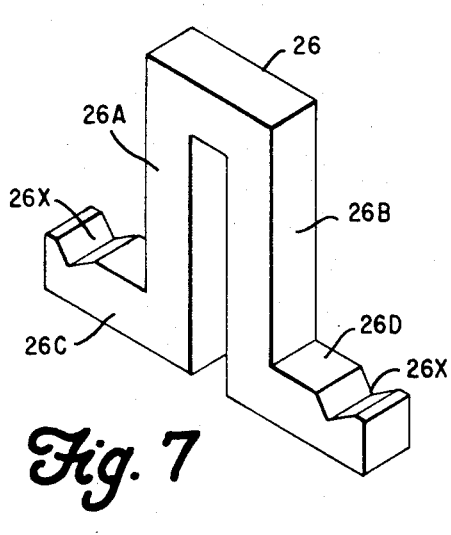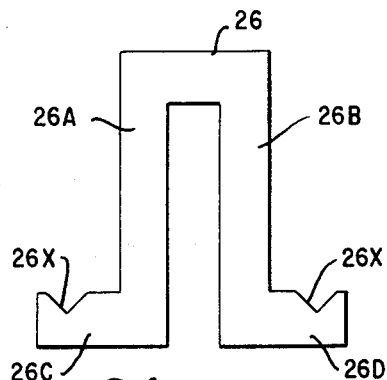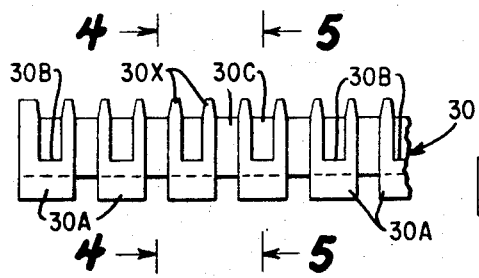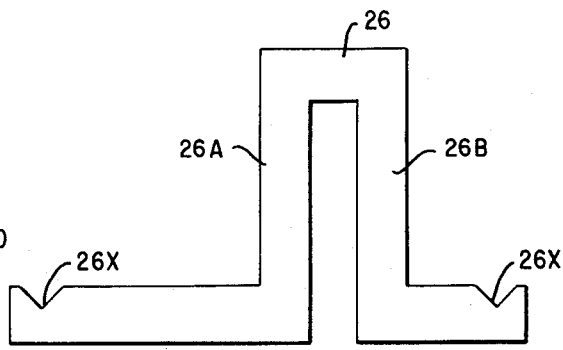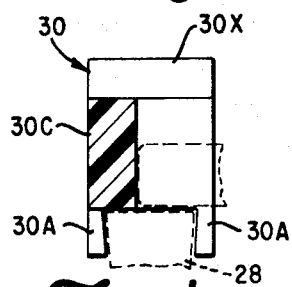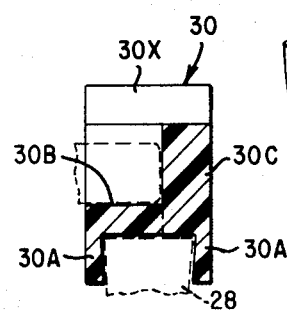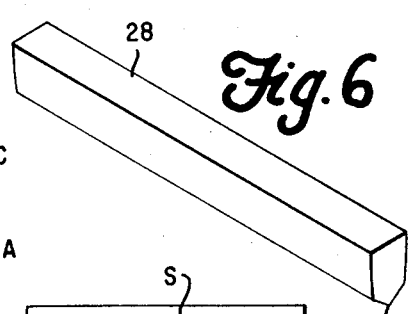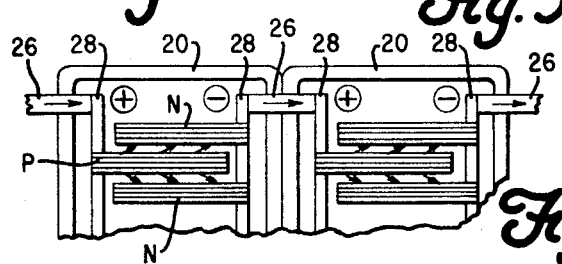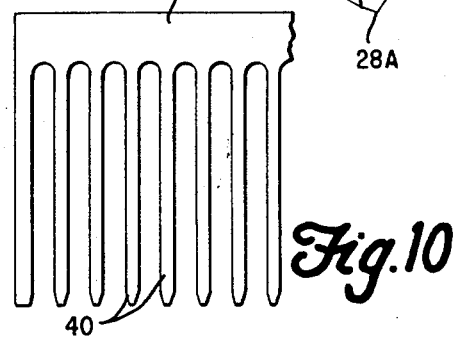

FORMING TANK FOR LEAD-ACID BATTERY PLATES

In the formation step for positive and negative plates for lead-acid storage batteries, it has been common practice to weld a lead to each plate or double plate for the purpose of making electrical connection thereto for the forming step, or a lead bar has been used near the bottom of a tank containing the electrolyte for the forming step whereby the lugs of the double plates rested in notches in the bars and by the action of gravity made the necessary electrical contact therewith. The first method mentioned is laborious and costly while the second method to be effective required cleaning & refurbishing at frequent intervals which necessarily required shutting down a production line.

The present invention contemplates the provision of a simplified method and apparatus for the forming step which utilizes a lead bar adjacent the top of the tank just below the electrolyte level in the tank on which the double grids are suspended in groups alternately by use of a spacer unit of insulating material having slots to cooperate with the lugs of the double grids, which allow electrical connection with one group of lugs while insulating the second adjacent group of lugs as will appear hereinafter.

It is therefore a principal object of this invention to provide a method of and apparatus for the formation of double plates for lead-acid storage batteries, wherein the double plates are suspended from a connector bar adjacent the upper region of a forming tank, which has cooperating therewith a spacer bar of insulating material to allow electrical connection to a first group of plates with the connector bar, while an adjacent second group of opposite polarity is suspended in insulating relation to the connector bar during a forming operation.

Other objects and advantages of this invention relating to the arrangement, operation and function of the related elements of the structure, to various details of construction, to combinations of parts and to economics of manufacture will be apparent to those skilled in the art upon consideration of the following description and appended claims, reference being had to the accompanying drawings forming a part of this specification wherein like reference characters designate corresponding parts in the several views.

FIG. 3 is an elevational view of a spacer member for the lugs of the plates

FIG. 4 is an elevational view partly in section taken along line 4—4 of FIG. 3

FIG. 5 is an elevational view partly in section taken along 5—5 of FIG. 3

FIG. 6 is an isometric view of a supporting bar for the lugs of the plates

FIG. 7, 8 and 9 are views of a bracket cooperating with the supporting bars shown in FIG. 6.

FIG. 10 is an elevational view of a portion of a spacer comb positioned between the plate group of opposite polarity, and FIG. 11 is a schematic diagram of the electrical connections for the forming operation on the positive and negative plates.

Figure 2:
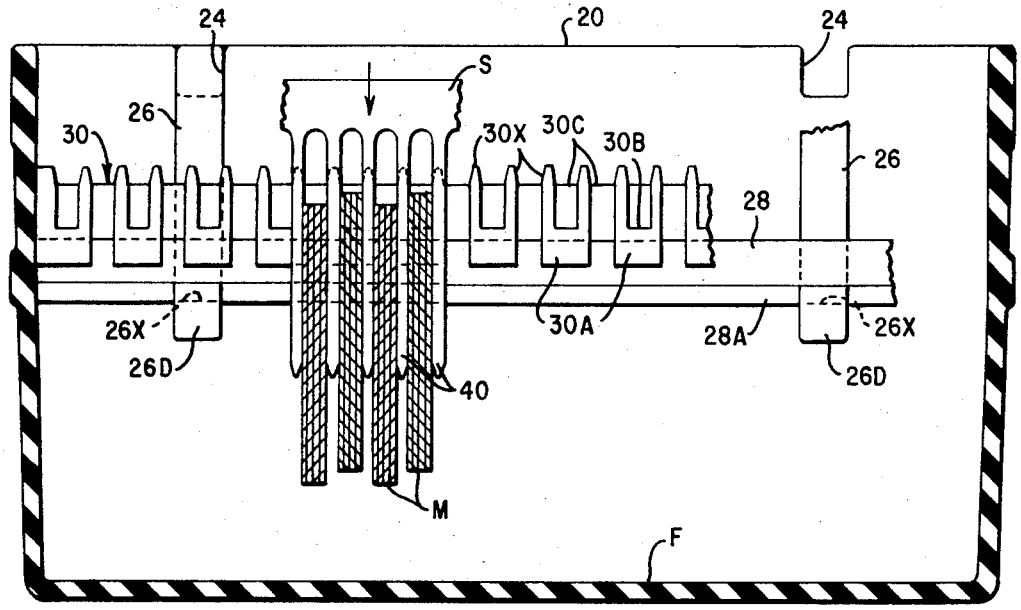
FIG. 2 is an elevational view partly in section take along line 2—2 of FIG. 1
Figure 1:
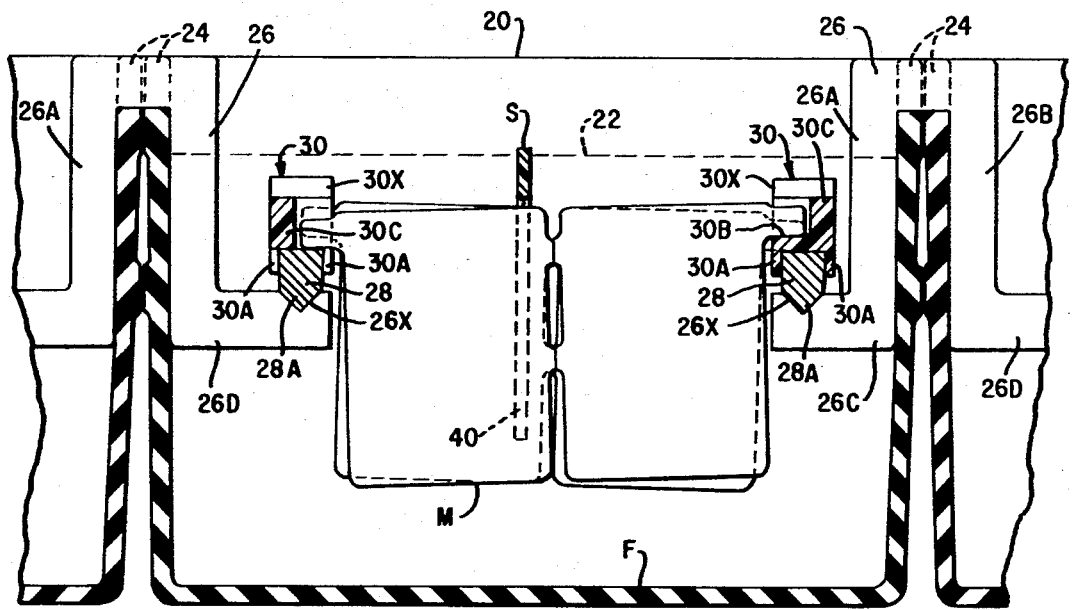
FIG. 1 is an elevational view partly in section of a forming tank incorporating the invention

Referring to the drawings particularly to FIGS. 1 and 2, a forming tank 20 is shown which is filled to the level 22 with a sulphuric acid electrolyte, which requires the tank to be fabricated from an acid-resistant material such as plastic material of which many are well known. Several of these tanks are placed in close juxtaposition as shown in FIG. 1, with the adjacent tank walls being provided with notches 24 which cooperate together and seat a U-shaped suspension bracket 26, which has depending arms 26A and 26B as best seen in FIGS. 7–9, which lie in parallel relation with the vertical walls of the tank immediately below the notches 24 to extend a considerable distance below the electrolyte level 22. At the bottom end of the arms 26A and 26B, horizontal extensions 26C and 26D are provided which project outwardly from the vertical wall of the tank 20 towards the center thereof as best seen in FIG. 1.

The horizontal extensions 26C and 26D can be made in varying lengths as shown in FIG. 9 to allow the formation of double plates of varying dimensions for different battery sizes and capacities as more clearly shown in FIG. 1, where the horizontal extension on the left side is considerably longer than that shown on the right side of the tank 20. Converging notches 26X are provided adjacent to the ends of the horizontal extensions to seat the ends of a connector bar 28 whose lower surface is molded to an apex 28A to closely fit into the notches 26X for good electrical connection thereto. The bar 28 is best seen in FIG. 6 where it is shown in perspective and also in FIGS. 1 and 2 where its cooperative relation with the horizontal extension is shown in elevation with a pair of brackets 26. The brackets 26 and the connector bars 28 are molded from lead alloys such as antimonial lead or the like. Two connector bars 28 are provided, each supported adjacent a tank side by a pair of brackets 26 so that the bars are held in fixed parallel relation in the tank.

Referring to FIGS. 3–5, a spacer unit 30 is shown molded of an insulating material which is acid-resistant and adapted to fit on the upper side of the connector bar 28, being provided with depending fingers 30A for this purpose. In FIGS. 4 and 5, enlarged views of a pair of spacer units 30 are shown in the same position and cooperative relation with each other and with a plate group as shown in FIG. 1, where the left end of the double plate makes electrical contact with its supporting connector bar 28, while the right end of the double plate rests upon an insulating floor 30B of the spacer unit 30, not making electrical contact with its supporting connector bar 28.

The spacer units may be molded as one piece or milled from a solid piece of insulating acid-resistant plastic material, being formed with the longitudinal channel at its bottom defined by the depending fingers 30A already described. The spacer units have a longitudinal back piece 30C which provide support for open-sided cup-shaped elements having the floor 30B already mentioned to support the lugs on one end of the double plates as shown in FIG. 5. The upwardly-extending walls of the elements extend above the back piece 30C to form a tapered bar 30X to guide the lugs between the walls to come to rest on the floor 30B during manual positioning of the plates in the loading operation, as best seen in FIG. 3. These portions also assist in the manual loading of the plates of opposite polarity between the cup-shaped elements to come to rest on the top of bar 28 as shown in FIG. 4 to make electrical contact with the connector bar. When the plate groups are loaded into the spacer units and suspended on the connector bars 28, their bottom terminal portions M are positioned a substantial distance above the floor F of the tank.

Referring now to FIG. 11, a schematic diagram of connection for the electrical circuit is shown for several forming tanks in series wherein sufficient electrical potential is applied to cause the desired amount of electric current to flow to perform the forming operation on the positive and negative plates. A group of positive plates P are positioned on the left connector bar 28 of FIG. 11 (as shown in FIG. 4) to make electrical contact therewith while the opposite end lugs are supported in insulated relation on the opposite bar 28. The electric current will then flow via the electrolyte to the adjacent negative groups of plates N as shown by the arrows to the second connector bar 28 thence through connecting bracket 26 to the next tank where the current will again flow to the positive plate group P through the electrolyte plate adjacent negative palte group N etc. from tank to tank. The forming methods are well known in the art and will not be described in further detail.

In order to keep the positive and negative group plate separated to prevent short circuit a separator comb S (FIG. 10) has its prongs 40 positioned between the groups as shown in FIG. 2. It will be noted that the plates group with their lugs are submerged in the electrolyte well below its upper level 22. All materials used both conducting and non-conducting must be acid resistant.

I claim:

1. In a forming tank for the plates of a lead-acid storage battery, a tank filled with electrolyte, a pair of brackets supported by the tank on each side thereof extending to point below the level of the electrolyte in the tank, a pair of connector bar supported at a point below the level of the electrolyte in the tank cooperating with a pair of brackets at each side of the tank whereby a fixed parallel relation is established between the connector bars, a spacer unit cooperating with each connector bar having openings to expose one connector bar to the lugs of a double plate group, said openings being separated by open cup-shaped portion adapted to support the lugs of an adjacent double plate group of opposite polarity, the openings and cup-shaped portion being proportioned and spaced so that separate plate group of given polarity are supported and electrically connected to the plate lugs at one end while at the other the lugs are supported in insulated relation with the opposite connector bar.

2. The forming tank defined in claim 1 further characterized by a spacer comb positioned between the plate groups of opposite polarity to avoid short-circuit.

3. The forming tank defined in claim 1 further characterized by the bracket being supported by the top edge of the tank to extend well below the electrolyte level of the tank.

4. The forming tank defined in claim 1 further characterized by having the plate groups of opposite polarity suspended from the parallel connector bars at the side of the ank.

5. The forming tank defined in claim 1 further characterized by the plate groups being suspended from the parallel connector bars a substantial distance above the floor of the tank.

* * * * *